Feb. 8, 1955
T. H. GEWECKE
2,701,565
DISTENDING PLASTIC TUBE
Filed Sept. 14, 1953
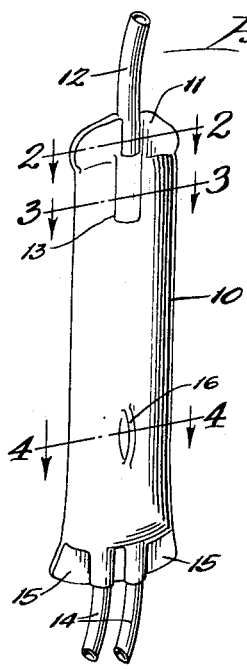
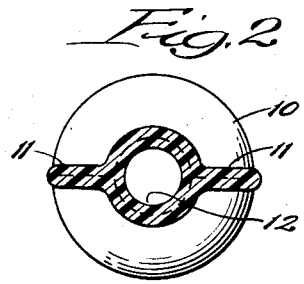
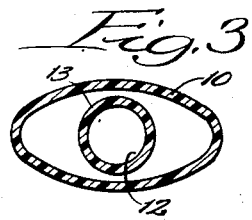
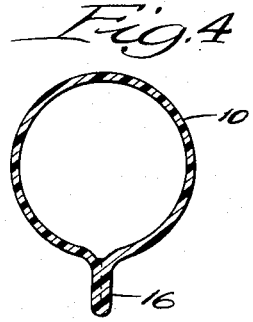
INVENTOR:
Theodore H. Gewecke,
BY
Dunsen, Tilton & Graham,
ATTORNEYS.

2,701,565

Patented Feb. 8, 1955

---

2,701,565

DISTENDING PLASTIC TUBE

Theodore H. Gewecke, Glenview, Ill., assignor to Baxter Laboratories, Inc., Morton Grove, Ill., a corporation of Delaware Application September 14, 1953, Serial No. 379,996

7 Claims. (Cl. 128—214)

This invention relates to distending plastic tubes. The invention is particularly useful in rendering a plastic tube round in those instances where a round or fully distended plastic tube is desired. For example, in forming a drip tube of plastic material where liquid is dropped through the transparent plastic tube and the rate of drops observed, it is often found that the outer tube becomes misshaped or flattened and there is a tendency for the drops to move into contact with a side wall of the outer tube and thus to destroy the value of the structure as a sight drip tube. The invention, while useful in the respect mentioned, obviously has other usefulness.

An object of the invention is to provide a simple method and means for rendering a plastic tube relatively round and maintaining it in round shape. A further object is to provide a method and means for causing a flattened plastic tube to become substantially circular in cross section. Yet another object is to provide a drip tube of improved characteristics which may be inexpensively formed and which will maintain the outer tube in distended relation about the inlet or drop tube. Other objects and advantages will appear as the specification proceeds.

The invention is shown, in an illustrative embodiment, by the accompanying drawing, in which—

Figure 1 is a perspective view of a tube embodying my invention and showing my novel method; Fig. 2, a transverse, sectional view, on an enlarged scale, the section being taken as indicated at line 2—2 of Fig. 1; Fig. 3, a transverse, sectional view, the section being taken as indicated at line 3—3 of Fig. 1; and Fig. 4, a transverse, sectional view, the section being taken as indicated at line 4—4 of Fig. 1.

In the illustration given, 10 designates a plastic tube such as a tube formed of polyvinyl chloride, polyethylene, and similar plastics. There are a large number of thermoplastic flexible tubes which are adapted for use in the forming of drip tubes and similar objects. The difficulty, however, with such plastic material is that due to its flexibility there is a tendency for the plastic to sag and to form a relatively flat enclosure. This is particularly true when one end of the tube is flattened to form a seal as indicated at 11 in Fig. 1. In the forming of the structure shown in Fig. 1, the inlet tube 12 is extended into the upper end of the tube 10 and the upper end of the tube 10 is then heat sealed, as indicated at 11, to form a tight closure about the inlet tube 12, part of which projects below the seal and forms an inlet or drop tube 13. A nurse or doctor, by observing the dropping oc liquid from the tube 13, can determine whether the fluid is being administered at the proper rate. The tube 10 may be provided at its bottom with one or more outlet tubes 14, and the bottom of the tube may be sealed at 15 about the tubes 14.

I have discovered that if a sector portion of the tube 10 is pressed together to form a fin portion 16, as indicated more clearly in Fig. 4, the rigid fin portion 16 exerts a stiffening effect upon the tube 10 and causes it to assume the circular shape shown in Fig. 4 and to maintain such circular shape. It will be observed that it is only necessary to pinch together a peripheral portion of the tube 10 and to weld this portion together to form the rigid fin 16, the fin then serving to produce the desired circular shape 10. Thus, when the liquid is dropped from the tube 13 into the area therebelow, there is no tendency for the liquid to fall along the sides of the tube, but instead it falls through an open central area and the drops can be thus readily observed.

In the specific structure shown in Fig. 1, it will be observed that the tube 10 has both ends flattened in the same direction and such flattening tends to cause the tube 10 to flatten also throughout its length. Such flattening would render the tube unsuitable for use as a sight meter, because the drops of liquid from tube 13 would be certain to strike the side walls of the tube at intermediate points and thus the drops would not be visible. The flattening tendency of such end seals 11 and 15 is apparently effectively overcome by pinching the sector portion and fusing it to form the fins 16, as illustrated in Figs. 1 and 4. Thus, a drip tube can be quickly and inexpensively formed through the sealing operations described, and the resulting flatness of the tube overcome and the tube rendered round through the pinching and fin-forming operation described.

While, in the foregoing specification, I have set forth a specific structure and method in considerable detail for the purpose of illustrating the invention, it will be understood that such details of structure and method may be varied widely by those skilled in the art without departing from the spirit of my invention.

I claim:

1. In a process in which thermoplastic tubes are sealed at least at one end, thus tending to flatten the tube, the step of pinching a portion of said tube and heat sealing the same to form a fin extending generally at right angles to the seal of the tube.

2. The process of claim 1, in which both ends of the tube are heat sealed in the same plane, and in which the fin extends substantially in an opposite plane.

3. A process for distending a generally flat flexible thermoplastic tube, comprising taking a tuck in the body of the tube at right angles to the body when flat, and heat sealing the tucked portion to form a rigid fin thereof.

4. In a process for forming a drip tube, the steps of introducing an inlet tube within an outer thermoplastic transparent tube, sealing the outer tube about the inlet tube, and forming a tuck in the body of the outer tube below said inlet tube, and heat sealing the same to form a fin, said fin extending substantially at right angles to the plane of said seal.

5. A tube having an end thereof sealed along one plane, said tube having a body portion heat sealed to form a fin extending substantially at right angles to the plane of seal of said tube.

6. The structure of claim 5, in which both ends of said tube are sealed in the same plane.

7. A drip tube, comprising a thermoplastic transparent tube provided at one end with an outlet and at the other end with an inlet tube, said first-mentioned tube being heat sealed along one plane about said inlet tube, said first-mentioned tube having a body portion thereof below said inlet tube pinched together and heat sealed to form a fin extending at right angles to said plane of seal of said tube.

No references cited.